Oct. 4, 1938.                D. P. S. FOX                2,131,885
PROCESS FOR CLARIFYING AND STERILIZING BEER AND OTHER LIQUIDS
              Filed Sept. 3, 1935         2 Sheets-Sheet 1
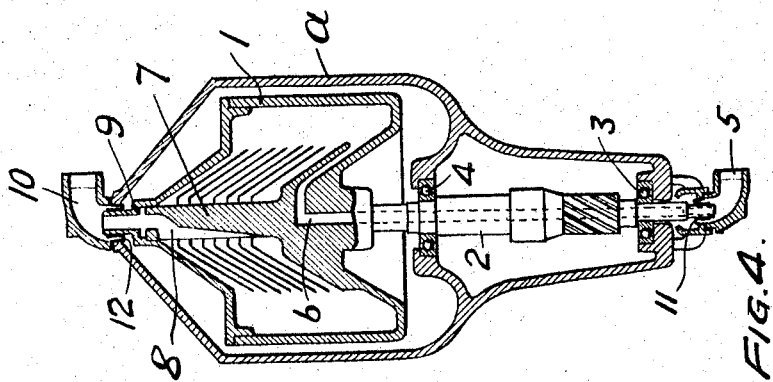
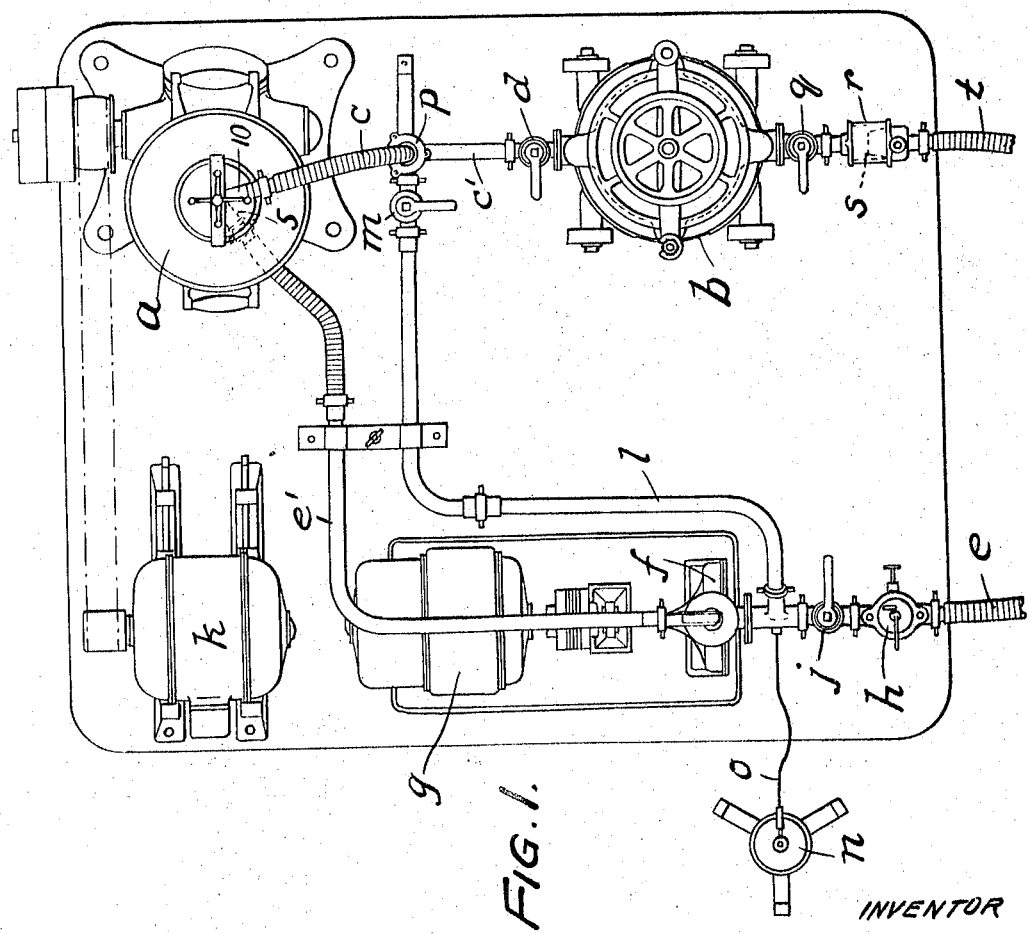
WITNESS:
INVENTOR
Douglas Percy Shoolbred Fox
BY
Busser and Harding
ATTORNEYS.

Patented Oct. 4, 1938

2,131,885

UNITED STATES PATENT OFFICE 2,131,885

PROCESS FOR CLARIFYING AND STERILIZING BEER AND OTHER LIQUIDS

Douglas Percy Shoolbred Fox, London, England, assignor to The De Laval Separator Company, New York, N. Y., a corporation of New Jersey Application September 3, 1935, Serial No. 39,015
In Great Britain September 4, 1934

2 Claims. (Cl. 99—48)

This invention relates to a new or improved process and apparatus for clarifying and sterilizing beer, yeas†, fruit juices and other liquids liable to fermentation or the like. The principal object of this invention is to enable the clarifying and sterilizing of beer and such other liquids to be performed more expeditiously and with greater economy and reliability.

Heretofore, the clarifying and par ial sterilizing of beers to be bottled has been commonly carried out by the aid of pulp filters comprising a number of cotton packs. This method has various disadvantages and drawbacks. Thus, for example, the packs become foul after a period of working so that they are no longer efficient and the cleansing thereof is a troublesome and lengthy procedure; the cleansing of the packs involves the loss of a certain quantity of beer made up of an amount contained by them just prior to cleansing and a further amount which becomes mixed with water which is present in the filter just after cleansing; the mass of pulp absorbs $CO_2$ from the beer so that the first few gallons filtered are deficient in $CO_2$; and finally, owing to the mass of cotton con†ained in the packs, it is possible for single short fibres to be carried away by the clarified beer, and each such fibre is a carrier of bacteria and therefore a potential medium for initiating fermentation in the subsequently bo'tled beer. Attempts have been made to achieve the desired result by making use of diatomaceous and asbestos pad filters. These filters screen the beer with a high degree of fineness but in order that they may present an adequate area for giving the output required they must be of large size and therefore expensive. Moreover, there are certain drawbacks associated with the employment of such filters: Thus objectionable disturbances of the filter mass may be caused by momentary back pressure and, in any event, they are apt to affect what is known as the "palate-fullness" of beer passed through them. Also, attempts have been made to employ combinations of filters, as, for example, a primary roughing filter and a secondary fine filter, such as a diatomaceous or asbestos filter. Such combinations are expensive and do not avoid the losses and difficulties incidental to the cleansing and running of such filters.

According to the present invention, the beer or other liquid is first passed in a closed circuit under pressure through a high speed rotary clarifier of the "closed" type adapted for performing its centrifugal separating operation with the liquid under the said pressure, and is then passed, whilst still in the closed circuit under pressure, through a cold sterilizer in the form of a filter adapted for having a very fine fil'ering and sterilizing action. It is an advantage of this process that the filter required may be of relatively small dimensions in comparison with the filters commonly employed heretofore as mentioned above. For example, the filter is preferably a filter press comprising a relatively small number of plates (for example three or four) composed of cellulose and asbestos fibre and having a very fine filtrative action. However, other forms of filter adapted for giving sterilization can be used successfully, as, for example, a diatomaceous fil er. A filter of this type may also be of relatively small dimensions, i. e. have an effective area equivalent to that of the plate-filter referred to above. With the process according to the invention, the impurities can readily be removed from the rotary clarifier from time to time and without any wastage of the liquid under trea'ment. Furthermore, the cold sterilizer requires only infrequent renewal of the plates, or cleansing, as it is required to remove only the last fraction of the impurities and, owing to i's small dimensions, the wastage of liquid attendant upon its cleansing is negligible. In the case of a plate-filter, the plates after a period of use may be destroyed and fresh plates substituted with little loss.

It is known to subject beer and other alcoholic liquids, fruit juices, etc., to cooling and centrifugal separation followed by filtration. The present invention, however, is dis'inguished by the separation being performed while the liquid is under the pressure of its contained gases and/or closed from communication with the atmosphere; for example, if the liquid being treated is beer, while it remains under the pressure of $CO_2$. Complete sterilization is thus obtained, because there can be no admission of air during this treatment under pressure. Also, which is of importance, the beer, if that be the liquid being treated, loses none of its $CO_2$; and similarly any other liquid being treated loses none of its vola'ile constituents, such, for example, as those imparting to the liquid a desired aroma. For the purpose of improving the quality of wine, beer and the like, it has also been proposed to admit the liquid to be trea'ed into a centrifugal machine in which the said liquid was successively churned, centrifuged and filtered before leaving the apparatus through a number of outlet pipes. In this case, also, operation under pressure was not contemplated.

The practical carrying out of the process according to the present invention involves the adoption of certain expedients for its success. In the first place, there is a pressure drop through the rotary clarifier and cold sterilizer which is principally due to the centrifugal action of the clarifier. This pressure drop should be compensated. Storage tanks from which the rough liquid is drawn for treatment are usually designed for a working pressure of about 30 lbs. per square inch and it is undesirable that the improved process should require the employment of new tanks designed for a higher pressure. In the second place, it is desirable that the liquid should be supplied to the rotary clarifier at a constantly uniform pressure. Consequently, the present invention provides a pressure booster and regulator which is advantageously in the form of a centrifugal pump operating for withdrawing the liquid under pressure from the tank and supplying it to the rotary clarifier at an elevated and regulated pressure.

In order to insure that properly clarified beer is supplied to the sterilizer, particularly when the apparatus is started after a period of rest, a circulating or by-pass connection is provided between the delivery of the clarifier and the intake of the pump. During a starting-up period, this by-pass connection is opened, so that the beer or other liquid to be treated is merely circulated through the pump and clarifier and is not passed on to the cold sterilizer. When the rotary clarifier has reached its working speed and is operating satisfactorily, the by-pass connection is closed and the clarified liquid is passed on to the cold sterilizer.

During starting up periods, a certain quantity of carbon dioxide gas may be lost by the liquid under treatment during the appreciable time that may elapse before the clarifier and cold sterilizer become fully charged and the working pressure gradient through the plant is established. To meet this contingency, a regulated source of carbon dioxide gas is connected with the intake of the pump. By this means, the correct amount of additional gas can be supplied to the liquid, during starting up periods, to compensate for any loss of gas and to maintain the gas pressure during such periods.

It is important to guard against the high speed centrifugal machine running dry if the supply of liquid should give out. For this purpose, an automatic check valve is provided between the supply pipe and the pump, this valve being adapted to be forcibly seated when flow of liquid ceases. Such seating of the valve arrests the flow through the pump and centrifugal clarifier so that the latter continues to run wet and is not liable to damage.

A check gauze may be fitted in a sight glass device on the delivery of the cold sterilizer. The sight glass enables the state of clarity to be observed at all times and the check gauze intercepts any stray fibres that may be carried through the delivery by the treated liquid.

In order to enable the invention to be readily understood, reference is made to the accompanying drawings illustrating a plant suitable for carrying out the improved process, in which drawings—

Fig. 1 is a plan of the plant;

Fig. 4 is a central vertical section of a centrifugal machine adapted for working as a rotary clarifier for the purposes of these improvements.

Figure 2:
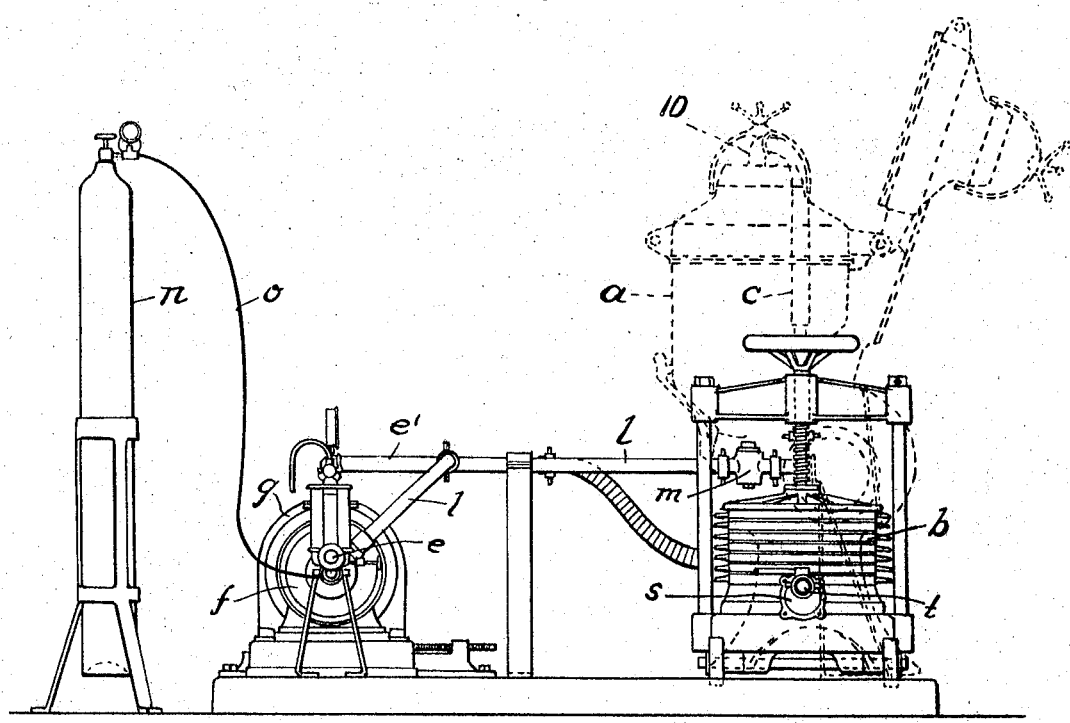
Figs. 2 and 3 are front and side elevations respectively.

$a$ indicates a high speed rotary clarifier which is a centrifugal machine of a known conical plate or multiple disc type modified to enable it to perform its centrifugal separating operation in a closed circuit under pressure as hereinafter explained. $b$ indicates a cold sterilizer, this being a filter press comprising a small number of plates, as, for example, three or four, these plates being advantageously of a mixture of cellulose material, e. g. cotton and asbestos in a minor proportion, as, for instance, 30%. The outlet from the rotary clarifier $a$ is connected by piping $c_1c^1$ with the inlet of the cold sterilizer $b$, the pipe $c^1$ being fitted with a shut-off cock $d$.

The beer or liquid to be treated is delivered to the plant from a tank or container through the pipe $e$. In the case of beer, this would usually be under a pressure of about 30 lbs. per square inch due to the generation or injection of carbon dioxide gas. As there may be a pressure drop over the clarifier $a$ and sterilizer $b$, a rotary or centrifugal pump $f$ driven by an electric motor $g$ receives the flow from the pipe $e$ and delivers the liquid at a regulated and suitably elevated pressure through the pipe $e^1$ to the clarifier $a$. The inflow to the pump $f$ may be fitted with a combined sight glass $h$ and check valve $h^1$ and with a shut-off cock $j$. If the supply gives out, the check valve, which may be a floating rubber ball, falls on to the port $h^2$ and the gas or air pressure holds it tight. The pump $f$ then gets no supply and simply churns gas so that the centrifugal clarifier remains charged with liquid and cannot be damaged by running dry at enormously high speed.

The clarifier $a$ is driven by an electric motor $k$ through transmission which is known and therefore is not shown in the drawings. As will be seen from Figure 4, the clarifier $a$ comprises a revoluble bowl 1 supported by a vertical spindle 2 running in bearings 3 and 4. The spindle 2 is hollow for the purpose of conveying liquid from the supply connection 5 to the inlet duct 6 of the bowl 1. The central pillar 7 in the bowl 1 has cut in it grooves 8 in order to allow clarified liquid to pass from the bowl 1 through a delivery nozzle 9 and thence into the delivery connection 10. Between the supply connection 5 and the lower end of the spindle there is an hydraulic packing 11 and between the delivery connection 10 and the delivery nozzle 9 there is an hydraulic packing 12. As will be readily understood, the response of these packings to the pressures in the connections 5 and 10 has the effect of maintaining a very tight joint between the revolving and stationary parts. Thus, the centrifugal machine is adapted for clarifying liquid under pressure in accordance with the provisions of the present improvements.

In starting up the plant, it is necessary to provide for a circulation of liquid through the clarifier $a$ until the latter has attained its proper working speed and settled down to its work. Otherwise, imperfectly clarified liquid would be delivered to the sterilizer $b$. For this purpose, a by-pass or circulation pipe $l$ has one end connected with the junction between the pipes $c$ and $c^1$ and the other end connected with the inflow fitting of the pump $f$. A shut-off cock $m$ is provided on this by-pass $l$. Thus, when the clarifier is charged, the cocks $d$ and $j$ are closed and the cock $m$ opened, whereupon the isolated liquid circulates around through the pump $f$ and clarifier $a$ until the latter has settled down to its work, whereupon the cocks $d$ and $j$ are opened and the cock $m$ is closed. To compensate for loss of gas during this starting period, or at any other time, additional carbon dioxide or other suitable gas may be introduced into the inflow fitting of the pump $f$. In the drawings, this additional gas is supplied from a gas cylinder $n$ fitted with the usual reducing valve and is conducted to the inflow of the pump $f$ by means of flexible tubing $o$.

Figure 3:
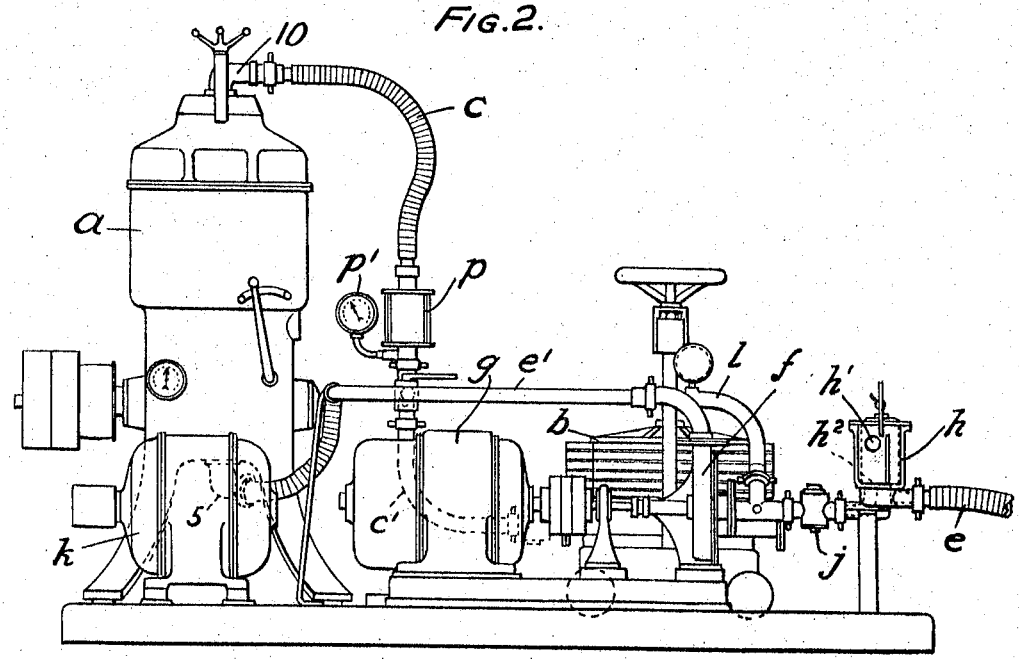

When the clarifier $a$ is in full operation, the liquid delivered into its bowl $l$ is treated centrifugally while remaining under pressure, the impurities being centrifugally separated outwards and retained at the wall of said bowl. The clarified liquid rises and is delivered into the pipe $c$. As will be seen from Fig. 3, a sight glass $p$ may be inserted between the pipes $c$ and $c^1$ in order to enable the state of clarity of the centrifuged liquid to be observed. A pressure gauge $p^1$ at this point gives pressure readings which enable the operator to make any necessary pressure adjustments, either by admission of additional gas or by adjustment of pump speed.

The centrifuged liquid is then passed through the cold sterilizer $b$, which retains bacteria and any particles not removed by the rotary clarifier $a$. As aforesaid, the filter pack of this sterilizer has a very fine filtering action, so that the liquid passed through its delivery cock $q$ and sight glass $r$ is normally free of particles and bacteria and is consequently in a sterilized condition. A check gauze $s$ is provided in the sight glass $r$ for retaining any fibres or other foreign particles which may be carried away from the filter of the sterilizer $b$. The sterilized liquid is delivered under pressure through the pipe $t$ by which it is conveyed to any desired place. In the case of carbonated liquids, such as beer, cider and the like, the pipe $t$ may lead direct to a bottling machine.

What I claim and desire to protect by Letters Patent is:

1. The hereinbefore described process for clarifying and sterilizing a liquid charged with gases which impose upon it a superatmospheric pressure which comprises admitting said liquid under pressure from a source of supply to a closed path, applying an augmented pressure to the liquid flowing through said closed path, subjecting the liquid flowing through said closed path successively to centrifugal clarification and filtration, and when the supply of liquid from the source of supply fails, closing the connection between the source of supply and the point of application of the augmented pressure and holding it closed by gas pressure.

2. In the hereinbefore described process for clarifying and sterilizing a liquid by flowing it from a source of supply and subjecting it, while under superatmospheric pressure, successively to centrifugal clarification and filtration in a closed path, the improvement which comprises starting the operation by closing said path between the locus of centrifugal clarification and the locus of filtration, providing a by-pass to establish an endless circuit through a part of said closed path including the locus of centrifugal clarification, admitting liquid to said circuit and flowing it endlessly therethrough, and then closing said by-pass and opening the closed path between the loci of centrifugal clarification and filtration and establishing a flow of the liquid to be clarified and sterilized through said closed path.

DOUGLAS PERCY SHOOLBRED FOX.